Oct. 7, 1941.  F. B. BRATEK ET AL  2,258,173
CARCASS REFRIGERATION
Filed June 9, 1939
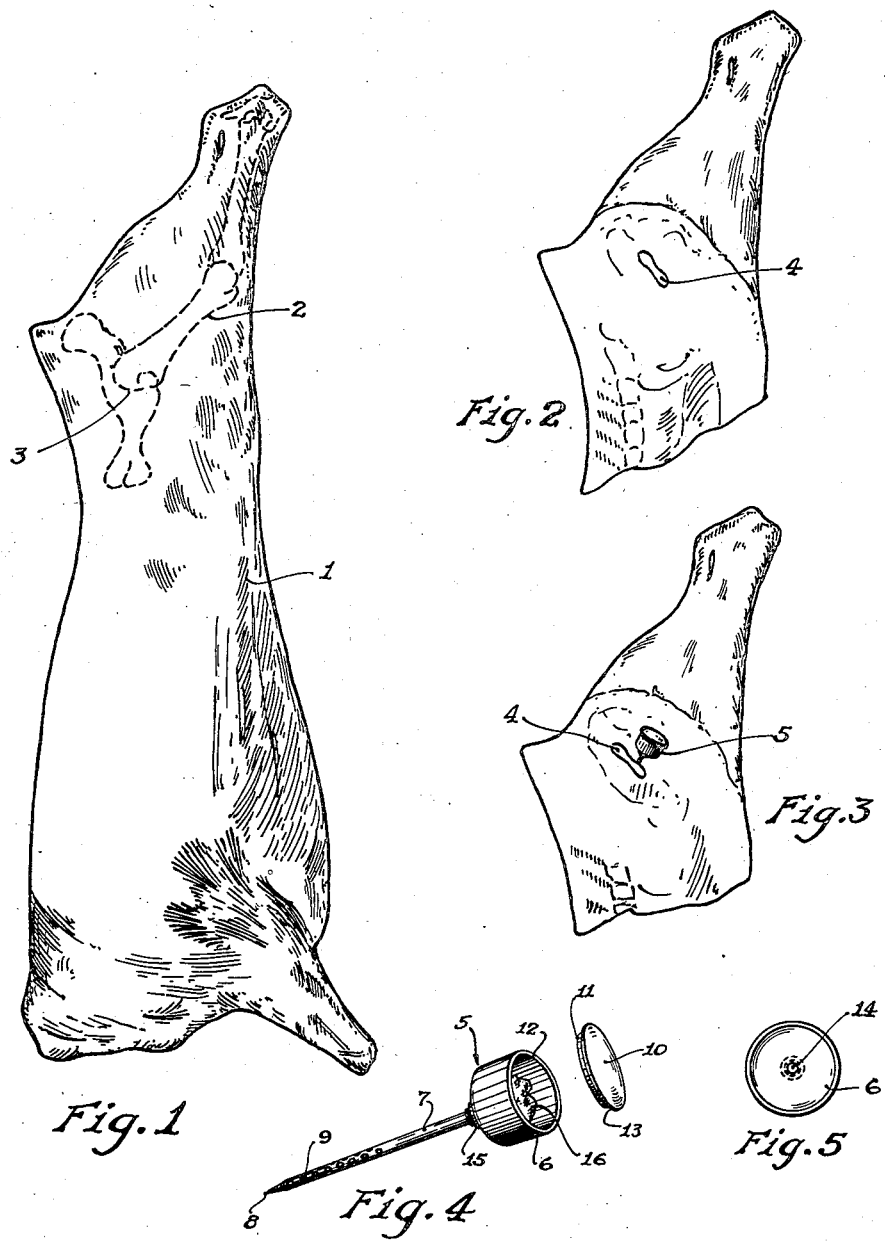
ATTEST-
Frank B. Bratek and
Harry H. McKee
INVENTOR
BY
ATTORNEY Patented Oct. 7, 1941

2,258,173

UNITED STATES PATENT OFFICE 2,258,173

CARCASS REFRIGERATION

Frank B. Bratek and Harry H. McKee, Chicago, Ill., assignors to Industrial Patents Corporation, Chicago, Ill., a corporation of Delaware Application June 9, 1939, Serial No. 278,372

2 Claims. (Cl. 62—91.5)

This invention relates to the selective refrigeration of specific portions of edible animal carcasses.

The invention has its greatest applicability in the treatment of beef carcasses and for that reason, without limiting the invention or restricting its scope in any manner, the invention will be described as applied to beef, particularly for the purpose of overcoming "sour rounds."

In packing house practice after a beef animal is slaughtered the hide, entrails and internal organs are removed, and the skeletal structure divided into two sides by splitting the backbone, after which the sides are hung in a refrigerated chamber to dissipate the animal heat and chill the beef.

Particularly during summer weather, difficulty is experienced in bringing the cooler temperature low enough to provide rapid chilling of a warm beef side. Inability to overcome this condition frequently results in "sour rounds," that is, a noticeable bacterial decomposition at the ball and socket joint of the hind quarter.

We have discovered that this difficulty may be obviated by placing a quantity of an anhydrous refrigerant at or near the ball and socket joint. We have also discovered that this difficulty may be obviated by conducting refrigeration to that portion of the carcass by suitable means. We have found that the mere ventilation of the interior of the round is ineffective and tends to damage the meat. It has been proposed to circulate cool brine through a refrigerating element inserted into the round. This procedure is unwieldy and does not lend itself to general application.

The present invention contemplates insertion of an anhydrous refrigerant such as solidified carbon dioxide into and below the surface of the meat in contact with or in close proximity to the portion of the carcass which it is desired to selectively refrigerate. It will be understood, of course, that the anhydrous refrigerant may be prepared in suitable sizes and shapes to be fully effective without waste of the anhydrous refrigerant.

The preferred method of carrying our invention is illustrated in the drawing.

Figure 1 is a side view of a side of beef.

Figure 2 is a plan view of the inside of a portion of the hind quarter of the side of beef shown in Figure 1.

Figure 3 is a view similar to Figure 2 showing a refrigeration cup in position.

Figure 4 is a perspective view of a refrigeration cup which is one aspect of the present invention.

Figure 5 is a plan view of the cup shown in Figure 4 with the cover removed.

Figure 1 illustrates a side of beef 1 showing bone structure 2 in dotted lines. Ball and socket joint 3 is the point at which "sour rounds" occur.

In Figures 2 and 3 the aitch bone cartilage 4 is shown, which serves as a ready means for identifying the spot at which refrigeration should be directed to avoid "sour rounds."

The refrigerant cup 5 shown in Figure 4 consists of a vessel 6 communicating with a hollow needle 7 having a point 8, openings 9 and a cover 10. The cover 10 is provided with a flange 13 which fits over the edge 12 of the vessel 6. The cover 10 is also provided with lip 11 to assure a close fit of the cover when it is placed on the vessel.

It will be noted by reference to Figure 5 that the interior of the vessel 6 communicates with the hollow needle 7 through opening 14. The hollow needle 7 may be secured to the vessel 6 by any suitable means as by collars 15.

In employing our novel refrigeration cup shown in Figure 4, to carry out the method of the present invention, a piece of an anhydrous refrigerant such as solidified carbon dioxide is placed in the interior of the vessel 6. A shaped piece may be employed or merely an irregular piece 16 of desired size. Cover 10 is placed in position and the point 8 of the needle 7 is inserted in the meat adjacent the aitch bone cartilage 4. The needle 7 is plunged into the top of the round until the point lodges in the ball and socket joint 3 or adjacent thereto. As the anhydrous refrigerant sublimates, the heavy gas formed by sublimation tends to gravitate into the hollow needle and escapes through the openings into the product. It will be readily apparent that there is also an important heat exchange between the needle and the product. Our refrigeration cup may be employed for selective refrigeration of other portions of the carcass or for selective refrigeration of other commodities. It will be understood, of course, that the refrigeration cup may be suitably insulated to prevent incidental loss of refrigeration through the walls of the vessel or of the cover.

We claim:

1. A refrigerating apparatus comprising a vessel adapted to contain a non-gaseous, anhydrous, carbon dioxide refrigerant, and a needle having a tapered point on one end rigidly attached to said vessel which needle has a hollow core which communicates with said vessel near the other end and at least one opening from the exterior of said needle to said hollow core near the pointed end of said needle.

2. A refrigerating apparatus comprising a vessel with a removable cover, said vessel being adapted to contain a solid, normally-gaseous, anhydrous refrigerant, and a needle rigidly attached to said vessel which needle has a hollow core which communicates with said vessel at the point where it is rigidly attached thereto, a point on the other end and perforations near the pointed end from the hollow core through the exterior of said needle.

FRANK B. BRATEK.
HARRY H. McKEE.